United States Patent
Hale

(10) Patent No.: US 11,515,713 B2
(45) Date of Patent: Nov. 29, 2022

(54) MONITORING AND BALANCING CAPACITY IN LITHIUM SULFUR CELLS ARRANGED IN SERIES

(71) Applicant: Johnson Matthey PLC, London (GB)

(72) Inventor: Christopher Hale, Abingdon (GB)

(73) Assignee: Johnson Matthey PLC, London (GB)

( * ) Notice: Subject to any disclaimer, the term of this patent is extended or adjusted under 35 U.S.C. 154(b) by 913 days.

(21) Appl. No.: 15/753,313

(22) PCT Filed: Aug. 18, 2016

(86) PCT No.: PCT/GB2016/052559
§ 371 (c)(1),
(2) Date: Feb. 17, 2018

(87) PCT Pub. No.: WO2017/029508
PCT Pub. Date: Feb. 23, 2017

(65) Prior Publication Data
US 2018/0248386 A1 Aug. 30, 2018

(30) Foreign Application Priority Data
Aug. 18, 2015 (GB) ...................... 1514684

(51) Int. Cl.
*H02J 7/00* (2006.01)
*H01M 10/44* (2006.01)

(52) U.S. Cl.
CPC ........... *H02J 7/0021* (2013.01); *H01M 10/44* (2013.01); *H02J 7/0014* (2013.01); *H02J 7/007184* (2020.01); *H02J 7/0048* (2020.01)

(58) Field of Classification Search
CPC .......... H02J 7/0021; H02J 7/00718; H02J 7/007182; H02J 7/0014; H02J 7/007184;
(Continued)

(56) References Cited

U.S. PATENT DOCUMENTS 5,140,252 A * 8/1992 Kizu ................. H02J 7/007184
320/151
7,830,125 B2 11/2010 Ibrahim
(Continued)

FOREIGN PATENT DOCUMENTS

EP 2448085 A1 5/2012
EP 2531869 12/2012
(Continued)

OTHER PUBLICATIONS

International Search Report and Written Opinion for application No. PCT/GB2016/052559 dated Nov. 8, 2016.
(Continued)

*Primary Examiner* — Edward Tso
*Assistant Examiner* — Ahmed H Omar
(74) *Attorney, Agent, or Firm* — BakerHostetler

(57) ABSTRACT

Apparatus for monitoring relative capacity and state of charge between at least two cells, or cell modules, A and B of a plurality of Lithium Sulfur cells arranged in series, comprising: a timer; a voltage monitoring module configured to monitor a voltage drop across each of the Lithium Sulfur cells or cell modules arranged in series based on signals received from a voltage monitoring circuit; and a cell monitoring module coupled to the timer and the voltage monitoring module and configured to, during a charging cycle in which the cells are charged at a constant current: record a time stamp $T_1$(Cell A) at which the monitored voltage of the first cell, cell A, leading the charging reaches a first voltage $V_1$(cell A) set to be near top of charge as the rate of change of the monitored voltage measurably increases; record a time stamp $T_1$(Cell B) at which the monitored voltage of the cell B following the charging reaches the first voltage $V_1$(Cell A); record a time stamp $T_2$(Cell A) at which the monitored voltage of the leading cell
(Continued)

A reaches a second voltage $V_2$(Cell A) set to be substantially at a deemed top of charge; record a monitored voltage $V_2$(Cell B) of the following cell B at $T_2$(Cell A); and determine, based on at least $T_1$(Cell A), $T_1$(Cell B), $V_2$(Cell A) and $V_2$(Cell B), a metric indicative of a relative capacity difference between cell A and cell B.

30 Claims, 7 Drawing Sheets

(58) Field of Classification Search
CPC ....... H02J 7/0048; H01M 10/44; Y02E 60/10; G01R 31/382
See application file for complete search history.

(56) References Cited

U.S. PATENT DOCUMENTS

| | | | | |
|---|---|---|---|---|
| 9,857,429 | B2* | 1/2018 | Daiss | H02J 7/0072 |
| 10,038,223 | B2* | 7/2018 | Kolosnitsyn | H02J 7/00 |
| 2003/0222619 | A1* | 12/2003 | Formenti | H02J 7/0014 |
| | | | | 320/119 |
| 2007/0082270 | A1* | 4/2007 | Mikhaylik | H01M 10/0567 |
| | | | | 429/326 |
| 2007/0111988 | A1 | 5/2007 | Dally et al. | |
| 2009/0123813 | A1* | 5/2009 | Chiang | H01M 4/5825 |
| | | | | 429/50 |
| 2009/0243548 | A1* | 10/2009 | Hoff | H02J 7/00712 |
| | | | | 320/150 |
| 2010/0085009 | A1 | 4/2010 | Kang | |
| 2010/0253149 | A1* | 10/2010 | Iida | H02J 7/0021 |
| | | | | 307/77 |
| 2012/0176092 | A1* | 7/2012 | Fujii | G01R 31/3828 |
| | | | | 320/134 |
| 2013/0265058 | A1* | 10/2013 | Danner | G01R 31/396 |
| | | | | 324/433 |
| 2015/0100260 | A1* | 4/2015 | Joe | G01R 31/367 |
| | | | | 702/63 |
| 2015/0234014 | A1 | 8/2015 | Moganty et al. | |

FOREIGN PATENT DOCUMENTS

| | | | |
|---|---|---|---|
| GB | 2504228 A | * | 10/2013 |
| GB | 2504228 | | 1/2014 |
| GB | 2504228 A | | 1/2014 |
| WO | 2007111988 | | 10/2007 |
| WO | 2011/095513 A1 | | 8/2011 |

OTHER PUBLICATIONS

International Preliminary Reporton Patentability received for PCT Patent Application No. PCT/GB2016/052559, dated Nov. 2, 2017, 20 pages.
Office Action received for GB Application No. 1514684.8, dated Feb. 18, 2016, 5 pages.

* cited by examiner

MONITORING AND BALANCING CAPACITY IN LITHIUM SULFUR CELLS ARRANGED IN SERIES

CROSS-REFERENCE TO RELATED APPLICATIONS

The present invention is a 35 U.S.C. § 371 U.S. National Stage Application corresponding to PCT Application No. PCT/GB2016/052559, filed on Aug. 18, 2016, which claims priority to G.B. Application No. 1514684.8, filed Aug. 18, 2015. The entire content of each of the aforementioned patent applications is incorporated herein by reference.

TECHNICAL FIELD

The present disclosure relates to apparatuses, methods and computer program products for use in monitoring and balancing capacity in Lithium Sulfur cells arranged in series. The present disclosure also relates to a battery management system or energy system controller for monitoring and balancing charge and capacity in Lithium Sulfur cells arranged in series.

BACKGROUND

While Lithium-ion secondary cells are today mass produced and in common use, Lithium Sulfur (Li—S) is a next generation cell chemistry that, having a theoretical energy density 5 times greater than Li-ion, may better serve as an electrochemical energy store for a range of application.

A typical lithium-sulphur cell comprises an anode (negative electrode) formed from lithium metal or a lithium metal alloy, and a cathode (positive electrode) formed from elemental sulphur or other electroactive sulphur material. The sulphur or other electroactive sulphur-containing material may be mixed with an electrically conductive material, such as carbon, to improve its electrical conductivity. Typically, the carbon and sulphur are ground and then mixed with a solvent and a binder to form a slurry. The slurry is applied to a current collector and then dried to remove solvent. The resulting structure is calendared to form a composite structure, which is cut into the desired shape to form a cathode. A separator is placed on the cathode and a lithium anode placed on the separator. Electrolyte is then introduced into the assembled cell to wet the cathode and separator.

Lithium-sulphur cells are secondary cells. When a lithium-sulphur cell is discharged, the sulphur in the cathode is reduced in two-stages. In the first stage, the sulphur (e.g. elemental sulphur) is reduced to polysulphide species, $S_n^{2-}$ (n≥2). These species are generally soluble in the electrolyte. In the second stage of discharge, the polysulphide species are reduced to lithium sulphide, $Li_2S$, which, may be deposited on the surface of the anode.

Lithium-sulphur cells may be (re)charged by applying an external current to the cell. Typically, the cell is charged to a fixed cut-off voltage of, for example, 2.35 V. When the cell is charged, the two-stage mechanism occurs in reverse, with the lithium sulphide being oxidised to lithium polysulphide and thereafter to lithium and sulphur. This two-stage mechanism can be seen in both the discharging and charging profiles of a lithium-sulphur cell. Accordingly, when a lithium-sulphur cell is charged, in the first stage of charge, the voltage stays relatively constant during a long plateau. Then, as the cell transitions between the first to the second stage of charge (which occurs near top of charge), the rate of change of voltage measurably increases.

The use of such rechargeable, secondary cells (such as Li-ion or Li—S), in particular stacks thereof (batteries), for the purposes of charging them with stored electrochemical energy for later discharge and use is gaining increasing importance in a range of applications including in automotive, marine and other vehicle applications, in domestic and uninterruptable energy supplies, and in storage of energy produced from intermittent and renewable electricity sources for demand and load levelling in domestic and grid-tied power networks.

In order to effectively support energy storage and use in these applications, it is desirable to maximise the effective capacity and lifetime of the cells in a cell stack, and to manage the charging and discharging cycles of the cells to optimise performance.

The cells of a cell stack are typically manufactured to perform with rated capacities and so should (within operational and manufacturing tolerances), at least initially, perform identically in charge-discharge cycles. However, in a cell stack, the states of health and performance of the different cells during charge-discharge cycles begin to deviate through use due to a number of factors including temperature variations in the cell stack during use, measurement errors in sensors and variations in other electronic and electrical components, and through variations in production within manufacturing tolerances and small variations in the cells' inherent performances and ageing characteristics being exacerbated over time and through use. Thus, over a period of use, the cells in a cell stack typically become varied in their states of health and capacities, and consequently, at a given time of charge/discharge operation, the different cells will have differing states of charge and amounts of stored charge remaining.

It is possible that, due to these variations and interactions between cells, individual cells in a series chain could become overstressed leading to premature failure of the cell. During the charging cycle, if there is a degraded cell in the chain with a diminished capacity, there is a danger that once it has reached its full charge it will be subject to overcharging until the rest of the cells in the chain reach their full charge. The result is temperature and pressure build up and possible damage to the cell. With every charge—discharge cycle the weaker cells will get weaker until the battery fails. During discharging, the weakest cell will have the greatest depth of discharge and will tend to fail before the others. It is even possible for the voltage on the weaker cells to be reversed as they become fully discharged before the rest of the cells also resulting in early failure of the cell. Thus unbalanced cell ageing leading to variations in cell states of charge in charge discharge cycles in a stack of cells or cell modules (a number of said cells arranged in parallel) connected in series can lead to a high failure rate of individual cells, and poor reliability of the cell stack as a whole. Unbalanced ageing is less of a problem with parallel chains which tend to be self-balancing since the parallel connection holds all the cells at the same voltage and at the same time allows charge to move between cells whether or not an external voltage is applied. Once a cell in a series cell stack has failed, the entire battery must be replaced and the consequences are extremely costly. Replacing individual failed cells does not solve the problem since the characteristics of a fresh cell would be quite different from the aged cells in the chain and failure would soon occur once more. Some degree of refurbishment is possible by cannibalising batteries of similar age and usage but it can never achieve the level of cell matching and reliability possible with new cells.

To provide a dynamic solution to this problem which takes into account the ageing and operating conditions of the cells, a battery management system (BMS) configured for controlling the charging and discharging of the cell stage may incorporate a cell balancing module to prevent individual cells from becoming overstressed and minimise cell-to-cell variations in charge. These systems monitor the voltage (or SOC) of each cell in the chain. Switching circuits then control the charge applied to each individual cell in the chain during the charging (or possibly discharging) process to equalise the charge on all the cells in the pack. Battery balancing carries out state of charge equalisation that is intended to prevent large long term unbalance rather than simply small short term, intra-cycle or cycle-to-cycle deviations between cells relative states of charge. These battery balancing and battery redistribution techniques maximize the capacity of a battery pack with multiple cells in series to make all of its energy available for use and increase the battery's longevity. Cell balancing modules are often found in the BMS lithium-ion battery packs for cell phones and laptop computers. They can also be found in electric vehicle battery packs.

Without charge redistribution, discharging must stop when the cell with the lowest capacity is empty (even though other cells are still not empty); this limits the energy that can be taken from and returned to the battery.

Without balancing, the cell of smallest capacity is a "weak point" in the cell stack, as it can be easily overcharged or over-discharged while cells with higher capacity undergo only partial cycle. For the higher capacity cells to undergo full charge/discharge cycle of the largest amplitude, the cell balancing module should act to "protect" the weaker cells. Thus in in a balanced battery, the cell with the largest capacity can be filled without overcharging any other (i.e. weaker, smaller) cell, and it can be emptied without over-discharging any other cell. Battery balancing is done by transferring energy from or to individual cells, until the SOC of the cell with the lowest capacity is equal to the battery's SOC.

Traditionally there are two approaches to stack balancing; active balancing and passive balancing.

Passive balancing is a process where the individual cell voltages are monitored during a charge process and any cell whose voltage is leading that of the lowest voltage cell, will periodically switch a bypass resistor across the cell to divert some of the charge current from that cell. Applying a bypass resistor will slow down a cell's charge process and allow the lowest voltage cells to catch up, such that at the top of charge, all cells maintain the same voltage (within a typical measurement tolerance).

Passive balancing is typically used to rectify 'cell spread' where any cell within the stack subject to a higher self-discharge rate (typically through storage or attached electronics) can be brought back in line with other cells. This method is still dependent on the capacity of the weakest cell and generally utilises the period towards the top of charge on a standard constant current/constant charge regime where current is tapering off towards the top of charge, allowing the bypass balancing resistor to be more effective.

Active balancing is a process where charge is taken from the strongest cell using DC converters (or simple switched capacitors) and moved to the weakest cell to keep the cells in balance. This approach may be used during discharge as well as charge to compensate for a low capacity cell. As with passive balancing it is generally more effective during the tapering charge. Since it is impractical to provide independent charging for all the individual cells simultaneously, the balancing charge must be applied sequentially. Taking into account the charging times for each cell, the equalisation process is also very time consuming with charging times measured in hours.

It is therefore crucial to the reliability and effectiveness of stacks of secondary cells in their applications as energy stores and sources to be able to effectively balance the constituent cells.

It is in the above context that the present disclosure is devised.

SUMMARY OF THE INVENTION

Both the active and passive balancing methods are typically designed for balancing Li-ion cells. The present inventor has recognised that, Lithium Sulfur (Li—S) cells, on the other hand, due to their voltage profile, can only practically apply voltage based stack balancing techniques during the final 10% of charge, and since the charge process is constant current throughout, and there is no taper charge period, so balancing can only practically occur during the final one tenth of the total charge time. Further, both active and passive balancing techniques require accurate voltage or state of charge measurements in order to be effective. Given that, for Li—S cells, in the first stage of charging, the cell voltage remains at a plateau throughout, making accurate measurement and discrimination of cell voltage difficult, and that the second stage of charging, where the rate of change of voltage measurably increases, persists for a relatively short time of the charging cycle, the ability to accurately determine voltage and relative state of charge in this second charging long period is crucial to effectively implementing cell balancing schemes in Li—S cells.

The present inventors have realised therefore that, in Li—S cells, due to the practical measurement resolution and accuracy of voltage being typically low (on the order of a few mV), the ability to determine state of charge or relative capacity differences in the second stage of charge from measured voltage values accurately enough to control a cell active or passive balancing scheme is limited.

Thus, viewed from one aspect, the present disclosure provides apparatus for monitoring relative capacity and state of charge between at least two cells, or cell modules, A and B of a plurality of Lithium Sulfur cells arranged in series, comprising: a timer; a voltage monitoring module configured to monitor a voltage drop across each of the Lithium Sulfur cells or cell modules arranged in series based on signals received from a voltage monitoring circuit; and a cell monitoring module coupled to the timer and the voltage monitoring module and configured to, during a charging cycle in which the cells are charged at a constant current: record a time stamp $T_1$(Cell A) at which the monitored voltage of the first cell, cell A, leading the charging reaches a first voltage $V_1$(cell A) set to be near top of charge as the rate of change of the monitored voltage measurably increases; record a time stamp $T_1$(Cell B) at which the monitored voltage of the cell B following the charging reaches the first voltage $V_1$(Cell A); record a time stamp $T_2$(Cell A) at which the monitored voltage of the leading cell A reaches a second voltage $V_2$(Cell A) set to be substantially at a deemed top of charge; record a monitored voltage $V_2$(Cell B) of the following cell B at $T_2$(Cell A); and determine, based on at least $T_1$(Cell A), $T_1$(Cell B), $V_2$(Cell A) and $V_2$(Cell B), a metric indicative of a relative capacity difference between cell A and cell B.

In accordance with this aspect of the invention, and as will be shown herein, by using time stamps at which different cells in the stack reach given voltages (as time can be measured more accurately than cell voltage during charge in Li—S applications), measurements of state of charge, particularly the relative state of charge and capacity between different cells, can be accurately ascertained. That is, the present inventors have recognised that, as time can in practice be measured much more accurately than voltage in an Li—S charging regime, and as Li—S cell charging is constant current, charging time itself can be used as an indicator of capacity. Thus, by measuring the time at which different cells in the cell stack reach different measured voltages, a much more accurate measurement of the cells' relative capacities and states of charge can be realised than by just measuring voltage differences alone. This can be achieved in particular by measuring the time taken for the cells to charge across a voltage increment near top of charge in the second charging phase.

Where the second voltage is substantially at or near a deemed top of charge, this can be substantially within 0.5% SOC, or substantially within 1% SOC, or substantially within 1.5% SOC, or substantially within 2% SOC, or substantially within 2.5% SOC, or substantially within 3% SOC, or substantially within 4% SOC, or substantially within 5% SOC of the deemed top of charge.

In embodiments, the cell monitoring module is further configured to determine, as the metric indicative of a relative capacity difference between cell A and cell B, a relative time difference between the duration for Cell A to charge across the voltage increment between $V_1$(Cell A) and $V_2$(Cell A) and the projected duration for Cell B to charge across the same voltage increment. In embodiments, the cell monitoring module is configured to calculate the relative time difference between the duration for Cell A and Cell B to charge across the same voltage increment between $V_1$(Cell A) and $V_2$(Cell A) using the equation:

$$(T_1(\text{Cell } B) - T_1(\text{Cell } A)) - (V_2(\text{Cell } A) - V_2(\text{Cell } B)) \Big/ \frac{dV}{dt}$$

wherein $$\frac{dV}{dt}$$

is a deemed value of dV/dt over the voltage increment. This can provide a time difference usable in the control of a charge balancing circuit to balance the cells.

In embodiments, the deemed value of dV/dt over the voltage increment is calculated as the average rate of change of voltage over time for a rated Lithium Sulfur cell of the type corresponding to cell A from voltage $V_1$ to voltage $V_2$ when charging at the same charge rate and charge efficiency as cell B. Alternatively, in embodiments, the deemed value of dV/dt over the voltage increment is calculated as the measured average rate of change of voltage over time for Cell A or Cell B between $T_1$ and $T_2$ for that cell.

In embodiments, the cell monitoring module is further configured to calculate, for a relative capacity difference between Cell A and Cell B, the relative time difference between the duration for Cell A and Cell B to charge across the same voltage increment between $V_1$(Cell A) and $V_2$(Cell A) divided by the duration for Cell A to charge across the voltage increment between $V_1$(Cell A) and $V_2$(Cell A), i.e.:

$$\frac{(T_1(\text{Cell } B) - T_1(\text{Cell } A)) - (V_2(\text{Cell } A) - V_2(\text{Cell } B)) \Big/ \frac{dV}{dt}}{T_2(\text{Cell } A) - T_1(\text{Cell } A)}$$

This provides a percentage difference based on charging time, illustrating a relative capacity difference between the cells.

In embodiments, the cell monitoring module is further configured to determine the metric indicative of a relative capacity difference between cells for each of the plurality of Lithium Sulfur cells connected in series taking account of charging efficiency calculated as a function of expected capacity and measured charge in over the time period T1 to T2.

In embodiments, the cell monitoring module is further configured to determine a degree of discharge or relative SOC of a cell x of the cells (relative to a rated cell—cell A) at $T_2$(Cell A) by calculating:

$$\frac{T_2(\text{Cell } A)}{T_2(\text{Cell } A) + (V_2(\text{Cell } A) - V_2(\text{Cell } x)) \Big/ \frac{dV}{dt}}$$

The calculated degree of discharge of the cell x, together with the calculated relative capacity of that cell to a reference cell, can be used in the control of a charge balancing circuit to balance the cells.

In embodiments, to compensate for voltage measurement errors for a cell of the plurality of cells, the cell monitoring module is further configured to: analyse the monitored voltage readings for the cell over time to identify a measured observation voltage $V_m$ of a feature of the voltage curve known to occur in the charging profile of Lithium Sulfur cells of the same type as Cell A at a known voltage $V_f$ as the cell charges from $V_1$(Cell A) towards $V_2$(Cell A); and calculate a voltage measurement error of cell $V_e$ as $V_m$-$V_f$. By determining the measured voltage of a feature in the charging curve known to occur at a given voltage, any voltage measurement errors can be calibrated and removed for the cells, which allows more accurate charging, and less deterioration in the relative capacity differences in the cells.

In embodiments, the cell monitoring module is configured to identify, in the monitored voltage readings for a cell of the plurality of cells, a measured observation voltage $V_m$ corresponding to a feature of the charging curve known through testing of the Lithium Sulfur cells to occur in the charging profile at a known voltage $V_f$ between $V_1$ and $V_2$.

In embodiments, the known feature of the charging curve is an inflection point, and to identify, in the monitored voltage readings for a cell of the plurality of cells, a measured observation voltage corresponding to an inflection point, the cell monitoring module is configured to: record time stamps at which the rate of change of the monitored voltage for the cell dV/dt reaches a set of given values as dV/dt increases and decreases either side of the inflection; evaluate a time at which a mid-point between the time stamps corresponding to the increasing and decreasing values of dV/dt occurs; and evaluate a monitored voltage observed at the mid-point time as a monitored observation voltage for the inflection point.

In embodiments, the cell monitoring module is configured to identify, in the monitored voltage readings for the cell, a measured observation voltage corresponding to the point at which $d^2V/dt^2$ is at a maximum, which is known through testing of the Lithium Sulfur cells to occur in the charging profile at a known voltage between $V_1$ and $V_2$.

In embodiments, the cell monitoring module is configured to adjust the charged capacity calculation at $T_2$(Cell A) based on any observed voltage measurement error $V_e$ to obtain an actual charged capacity for the cell.

In embodiments, the cell monitoring module is further configured to: correct the monitored voltage values for a cell based on any observed voltage measurement error $V_e$ for that cell.

In embodiments, the apparatus further comprises a cell balancing control module, for balancing a charge across a plurality of the cells, the cell balancing control module being coupled to a cell balancing circuit operable by the cell balancing control module to actively or passively adjust the relative charge between one or more of the cells, the cell balancing control module also being coupled to the cell monitoring module and being configured to: control the operation of the cell balancing circuit in a constant current charging process or in a discharging process to cause the state of charge across a plurality of the cells to be more balanced based on one or more of: one or more values, received from the cell monitoring module, for a metric indicative of a relative capacity difference(s) between a plurality of the cells; and one or more values, received from the cell monitoring module, indicative of a degree of SOC variation of one or more of the cells at top of charge. By providing a cell balancing control module controlling a cell balancing circuit in this way, the apparatus can balance a plurality of the Li—S cells to equalise their operation, prolong their lives, and extract greater capacity from them in use. Various charge balancing schemes are possible once the relative capacities and/or states of charge are known.

In embodiments, the cell balancing control module and the cell balancing circuit, to cause the cells to be more balanced, are configured to together: during a constant current charging process, pause the charge process to cause a relative amount of charge to be drawn from the strongest cells based on a period of time calculated by the cell monitoring module, so a plurality of the cells all match the weakest cell; and then recommence charging to top up all the cells.

In embodiments, the cell balancing control module and the cell balancing circuit, to cause the cells to be more balanced, are configured together: during a storage state, divert a known quantity of charge from one or more of the cells to other cells over an extended period of time to equalise the state of charge across a plurality of the cells.

In embodiments, the cell balancing control module and the cell balancing circuit, to cause the cells to be more balanced, are configured together: during the discharge process, divert a known quantity of charge from one or more of the cells to other cells to equalise the state of charge across a plurality of the cells.

In embodiments, the cell balancing control module and the cell balancing circuit, if the top of charge voltage is determined by the cell monitoring module to have been reached through voltage measurement error, are configured together: continue a charging process for a period of 'over charge' to allow an actual 100% state of charge to be reached for the cells.

In embodiments, the apparatus further comprises one or more processors and computer readable medium storing instructions, which when executed by one or more of the processors, cause the processor or processors to implement one or more of the timer, the voltage monitoring module, the cell monitoring module, and the cell balancing control module of the above-disclosed apparatus and embodiments.

In embodiments, the apparatus further comprises a voltage monitoring circuit configured to measure a voltage drop across each of the Lithium Sulfur cells arranged in series and to provide signals indicative of said measured voltage drops to said voltage monitoring module.

Viewed from another aspect, the present disclosure provides a battery management system comprising plural Lithium Sulfur cells or energy system controller for coupling to plural Lithium Sulfur cells, comprising: apparatus in accordance with the above described aspects and embodiments arranged to monitor relative capacity and state of charge between at least two cells and to cause the cells to be more balanced.

Viewed from another aspect, the present disclosure provides computer readable medium storing instructions, which when executed by one or more processors of an apparatus for monitoring relative capacity and state of charge between at least two cells, or cell modules, A and B of a plurality of Lithium Sulfur cells arranged in series, cause the processor or processors to implement one or more of the timer, the voltage monitoring module, the cell monitoring module, and the cell balancing control module of the apparatus in accordance with the above described aspects and embodiments.

Viewed from another aspect, the present disclosure provides a method for monitoring relative capacity and state of charge between at least two cells, or cell modules, A and B of a plurality of Lithium Sulfur cells arranged in series, comprising: monitoring a voltage across each of the Lithium Sulfur cells or cell modules arranged in series based on signals received from a voltage monitoring circuit; and during a charging cycle in which the cells are charged at a constant current: recording a time stamp $T_1$(Cell A) at which the monitored voltage of the first cell, cell A, leading the charging reaches a first voltage $V_1$(cell A) set to be near top of charge as the rate of change of the monitored voltage measurably increases; recording a time stamp $T_1$(Cell B) at which the monitored voltage of the cell B following the charging reaches the first voltage $V_1$(Cell A); recording a time stamp $T_2$(Cell A) at which the monitored voltage of the leading cell A reaches a second voltage $V_2$(Cell A) set to be substantially at a deemed top of charge; recording a monitored voltage $V_2$(Cell B) of the following cell B at $T_2$(Cell A); and determining, based on at least $T_1$(Cell A), $T_1$(Cell B), $V_2$(Cell A) and $V_2$(Cell B), a metric indicative of a relative capacity difference between cell A and cell B or variation in relative state of charge.

The above described optional features implemented in embodiments of the apparatus in accordance with the first aspect are also to be considered to be disclosed herein as optional steps carried out in accordance with embodiments of the above described method.

BRIEF DESCRIPTION OF THE DRAWINGS

Certain embodiments of aspects of the disclosure will now be described, by way of example only, in which.

DETAILED DESCRIPTION OF THE EMBODIMENTS

Figure 1:
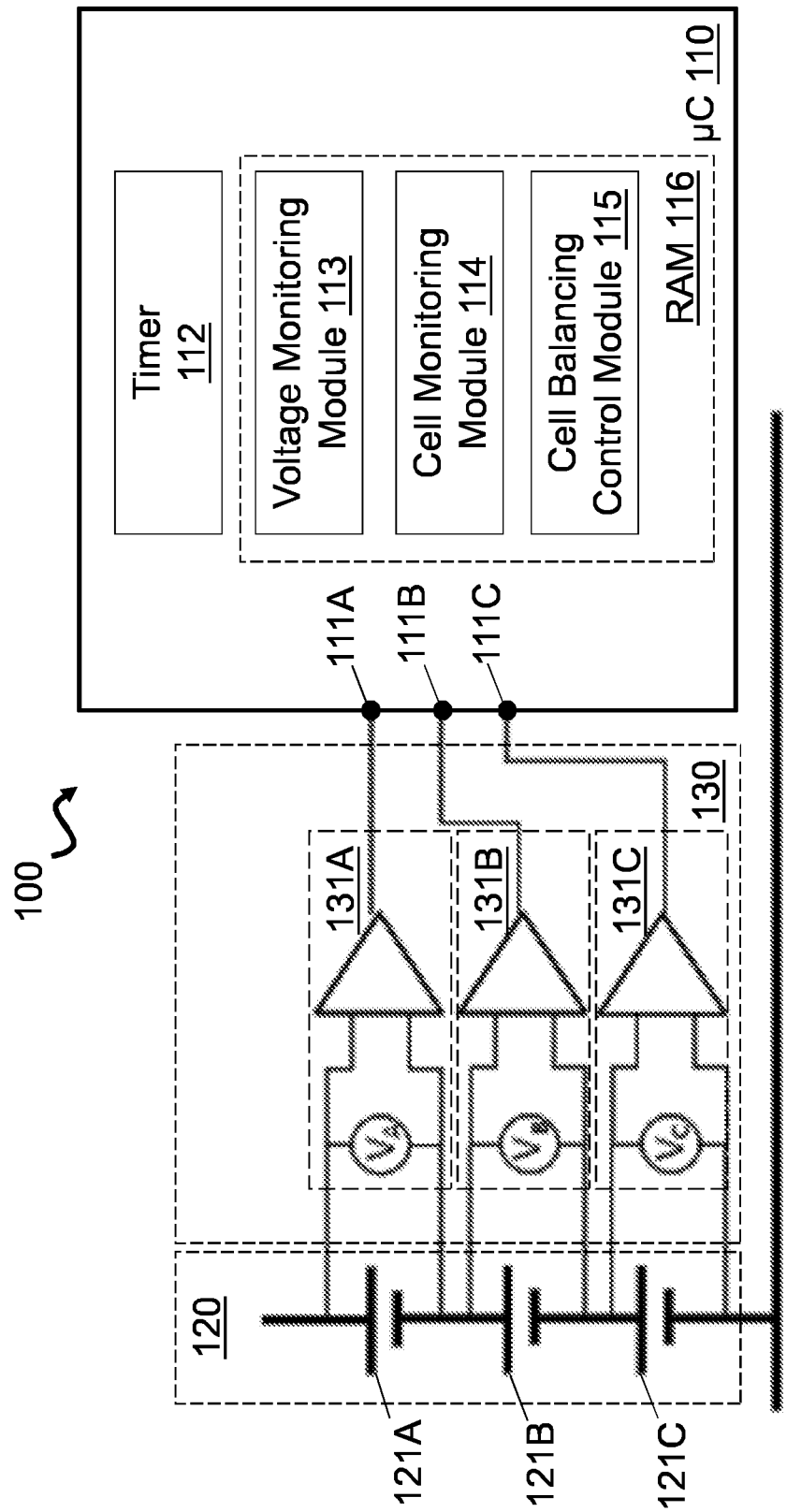
FIG. 1 is a schematic illustration of an apparatus 100 for monitoring relative capacity and state of charge between plural Lithium Sulfur cells connected in series in a cell stack in accordance with an embodiment.

Reference will now be made to FIG. 1, which shows a schematic illustration of an apparatus 100 for monitoring relative capacity and state of charge between plural Lithium Sulfur cells connected in series in a cell stack. In this case, the cell stack 120 includes notionally identical cells 121A, 121B and 121C having at least initially equivalent rated capacities connected in series to provide electric charge to a load (not shown) by converting electrochemical energy stored in the cells in a discharge cycle, and to store charge in a constant current charging cycle. In alternative embodiments, greater or fewer than three Li—S cells may be provided in the cell stack, and one or more of the cells may be provided as an individual electrochemical cell or as a cell module comprising more than one cell connected in parallel.

The apparatus 100 for monitoring relative capacity and state of charge between plural Lithium Sulfur cells connected in series in a cell stack 120 comprises a microcontroller 110 implementing one or more logical modules that carry out the monitoring, processing and control as described below in relation to FIG. 7. The microcontroller 110 is coupled to the cells of the cell stack 120 by a voltage monitoring circuit 130 comprising plural voltage monitors 131A, 131B, 131C, each having a comparator outputting an analogue voltage signal indicative of the voltage drop across the measured cell of the cell stack. Each voltage monitor 131A, 131B, 131C is configured to measure a voltage drop across its respective Lithium Sulfur cell or cell module and to provide a signal indicative of said measured voltage drop to said microcontroller 110 at input ports 111A, 111B, and 111C, respectively. The voltage monitoring circuit 130, and/or the cell stack 120 may be provided as part of the apparatus 100 for monitoring relative capacity and state of charge between plural Lithium Sulfur cells. Alternatively, the voltage monitoring circuit 130, and/or the cell stack 120 may be omitted and the apparatus 100 for monitoring relative capacity and state of charge between plural Lithium Sulfur cells may comprise the microprocessor absent these features. For example, the apparatus 100 may be provided as part of an energy system controller, configured to be coupled with a Li—S cell stack, voltage monitoring circuit and charge balancing circuit to monitor the relative capacity and state of charge between the cells and to control the charge balancing circuit to equalise them.

In embodiments, the apparatus 100 for monitoring relative capacity and state of charge between plural Lithium Sulfur cells is constituted by the microcontroller 110. In alternative embodiments, instead of a microcontroller 110, any other suitable data processing means could be provided to implement the logical modules which embody aspects of the present disclosure. For example, the logical modules could be implemented by a general purpose microprocessor such as a CPU being configured to operate under program control by instructions stored in computer readable medium, such as flash RAM.

The microcontroller 110, or in other embodiments, the suitably configured data processing apparatus, provides a timer 112, a voltage monitoring module 113, a cell monitoring module 114, and a cell balancing control module 115. The voltage monitoring module 113, cell monitoring module 114, and cell balancing control module 115 may be instantiated in RAM 116 of the microcontroller 110 by operation of the microcontroller 110 under program control of related firmware stored in RAM 116 for instantiating the logical modules.

The timer 112 is configured to output an indication of elapsed time and may be implemented in the microcontroller 110 by software or using an electronic oscillator such as a quartz-based electronic timer.

In broad terms, the voltage monitoring module 113 is configured to monitor a voltage drop across each of the Lithium Sulfur cells or cell modules arranged in series based on signals received at the ports 111A, 111B, 111C of the microcontroller from voltage monitoring circuit 130. Typically the voltage monitoring module 113 is a logical component implemented in the microcontroller 110 that is configured to receive as an input a digital representation of the analogue voltage signals received at the input ports 111A, 111B, 111C quantized by an analogue-to-digital converter (ADC) (not shown) provided as part of the microcontroller. The microcontroller may, for example, convert the received voltage signals using a 12 bit ADC, which, for a range of measured voltages of up to a deemed top of charge value of 2.35V, would result in the voltage monitoring module 113 having a measurement resolution on the order of 0.6 mV.

The cell monitoring module 114 is coupled to the timer 112 and the voltage monitoring module 113 and is configured to, during a charging cycle in which the Li—S cells are charged at a constant current (as they typically are), determine a metric indicative of a relative capacity difference between the cells. The cell monitoring module 114 may also be configured to determine a degree of discharge or State of Charge of the cells, and/or to determine a voltage measurement error of the cells (due, e.g., to the voltage monitoring circuit 130).

The cell balancing control module 115 is for balancing a charge across a plurality of the cells in the cell stack 120. The cell balancing control module 115 is coupled to a cell balancing circuit (not shown) operable by the cell balancing control module 115 (directly or indirectly) to actively or passively adjust the relative charge between one or more of the cells.

Figure 7:
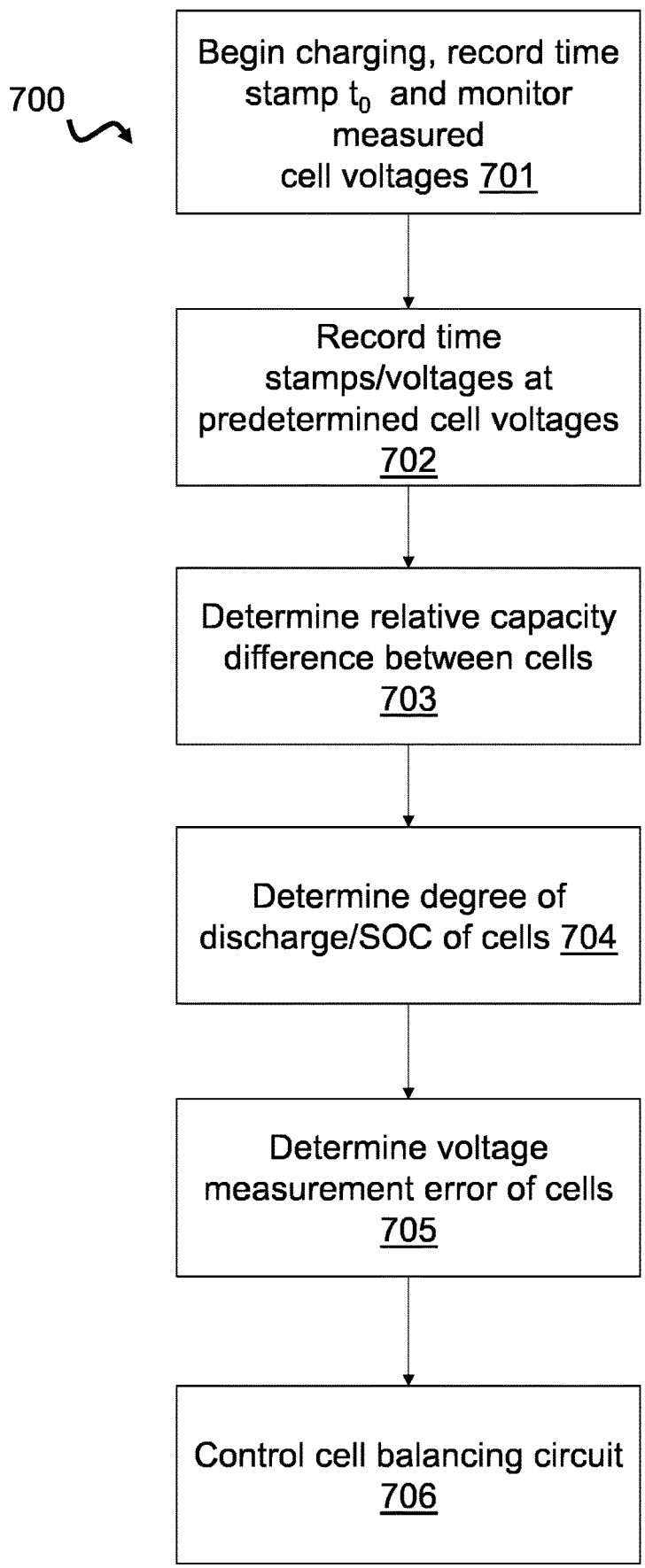
FIG. 7 shows a process flow chart for implementing a method for monitoring relative capacity and state of charge between plural Lithium Sulfur cells connected in series in a cell stack in accordance with an embodiment.

Reference will now be made to FIG. 7, which is a process flow diagram illustrating a method 700, carried out by the apparatus 100, for monitoring relative capacity and state of charge between plural Lithium Sulfur cells connected in series in a cell stack in embodiments.

First, in step 701, at the start of a constant current charging cycle, the timer 112 may be reset or the start time of the charging cycle is recorded as a time stamp $t_0$, while the voltage monitoring module 113 monitors the voltage of each of the cells in the stack 120.

Next, in step 702, the cell monitoring module 114 records, for each cell, a time stamp $T_1$(cell 121A, cell 121B . . . ) at which the monitored voltage of that cell reaches $V_1$. $V_1$ is chosen to be a voltage in a given percentage near the deemed top of charge for the Li—S cell, which is at $V_2$. Both $V_1$ and $V_2$ are taken to be within the second stage of charging for the Li—S cells, in which the rate of change of voltage measurably increases. In the examples set out herein, $V_1$ is taken as 2.30V and $V_2$ is taken as 2.35V. However, in alternative embodiments, different appropriate cell voltages may be chosen for this analysis.

Then, when the first cell of the monitored cell stack reaches the end of charge, i.e. $V_2$, the cell monitoring module 114 records another time stamp, $T_2$. At the same time, the cell monitoring module 114 also records the monitored voltages of the other cells at $T_2$.

Thus, once all the cells have reached the first voltage $V_1$, which is the same for each cell (i.e. 2.30V), the cell monitoring module 114 has recorded the different times $T_1$(121A), $T_1$(121B), $T_1$(121C) at which the cells each reach $V_1$. Then, when the first, or 'leading', cell has reached the deemed top of charge voltage, the cell monitoring module 114 records a stamp, $T_2$, which is the same for each cell, and a monitored cell voltage for each cell, i.e. $V_2$(121A), $V_2$(121B), $V_2$(121C), which may be different for each cell.

The cell monitoring module 114 then passes these time stamps and monitored cell voltages to the cell monitoring module 114.

Figure 2:
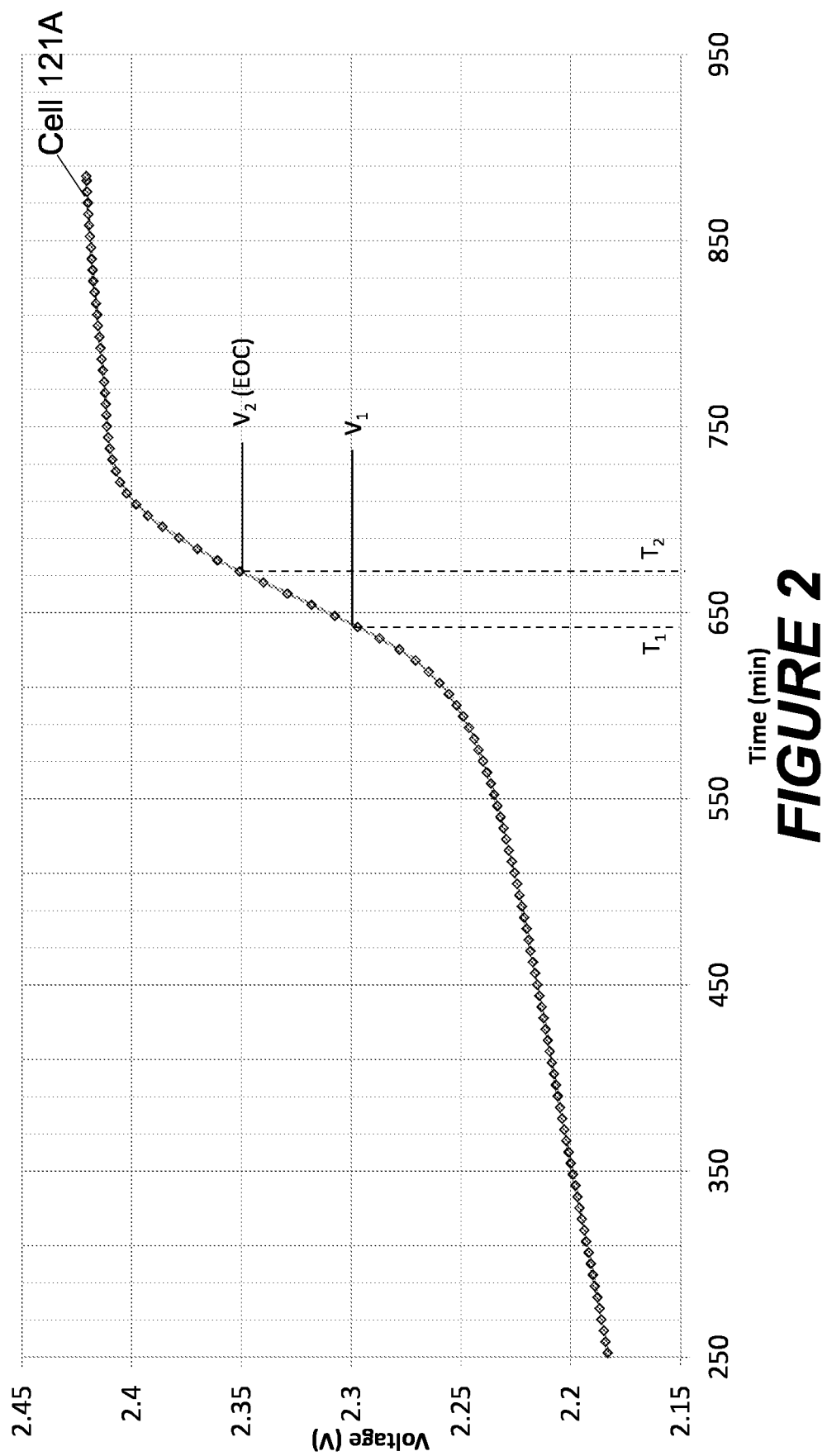
FIG. 2 is an example plot of the cell voltage for a single Li—S cell for a constant current charging cycle having a charging rate of C/10 against the charging time.

FIG. 2 is a plot of the cell voltage for a single cell 121A monitored by cell monitoring module 114 for a constant current charging cycle having a charging rate of C/10 against the charging time as given by timer 112. Normally, when the cell reaches the top of charge voltage of 2.35V, the charging process is stopped. However, in FIG. 2, the voltage during the overcharge period is shown for illustration.

The cell 121A is operating in accordance with its rated capacity for that cell type. FIG. 2 illustrates the times $T_1$, $T_2$ at which the cell 121A reaches voltages $V_1$=2.30V and $V_2$=2.35V. That is, the time $T_2$ at which the cell 121A reaches $V_2$=2.35V is measured to be 670 minutes from $T_0$.

Nominally, with a C/10 charge rate, the expected time to charge from a fully depleted battery would be 10 hours (i.e. 600 minutes). In practice the cells will exhibit a non-perfect charging efficiency extending the charge period. In FIG. 2, for this example, the charge duration to 2.35V (V2) is 670 mins (assuming $T_0$ was from full discharge), which gives a 600/670 or 89.5% charge efficiency.

Taking charging efficiency into account, it is intended that $V_2$ is taken to be the end of charge voltage which in this example is set to 2.35V and $V_1$ is taken to be a nominal voltage point where the state of charge would be 95%, which in this example is 2.30V. The nominal charge duration between $V_1$ and V2 is therefore 33.5 mins (i.e. 670*0.05). This is confirmed by time at which the measured voltage $V_1$(cell 121A)=2.30V is 636.5 mins (i.e. 670*0.95).

Therefore, taking this time representation of state of charge (SOC) into account, 1% SOC therefore represents either 10 mV measurement resolution or 6.7 minutes charge duration, and 1 minute of charge equates to 1.49 mV cell voltage increase. Since the measurements are referenced against time, the absolute accuracy of the voltage measurement is unimportant, and all voltages are therefore relative.

Then: in step 703, the cell monitoring module 114 determines a relative capacity difference between the cells; in step 704, the cell monitoring module 114 determines a relative degree of discharge for the cells; and, in step 705, the voltage measurement error for the cells is determined.

Figure 3:
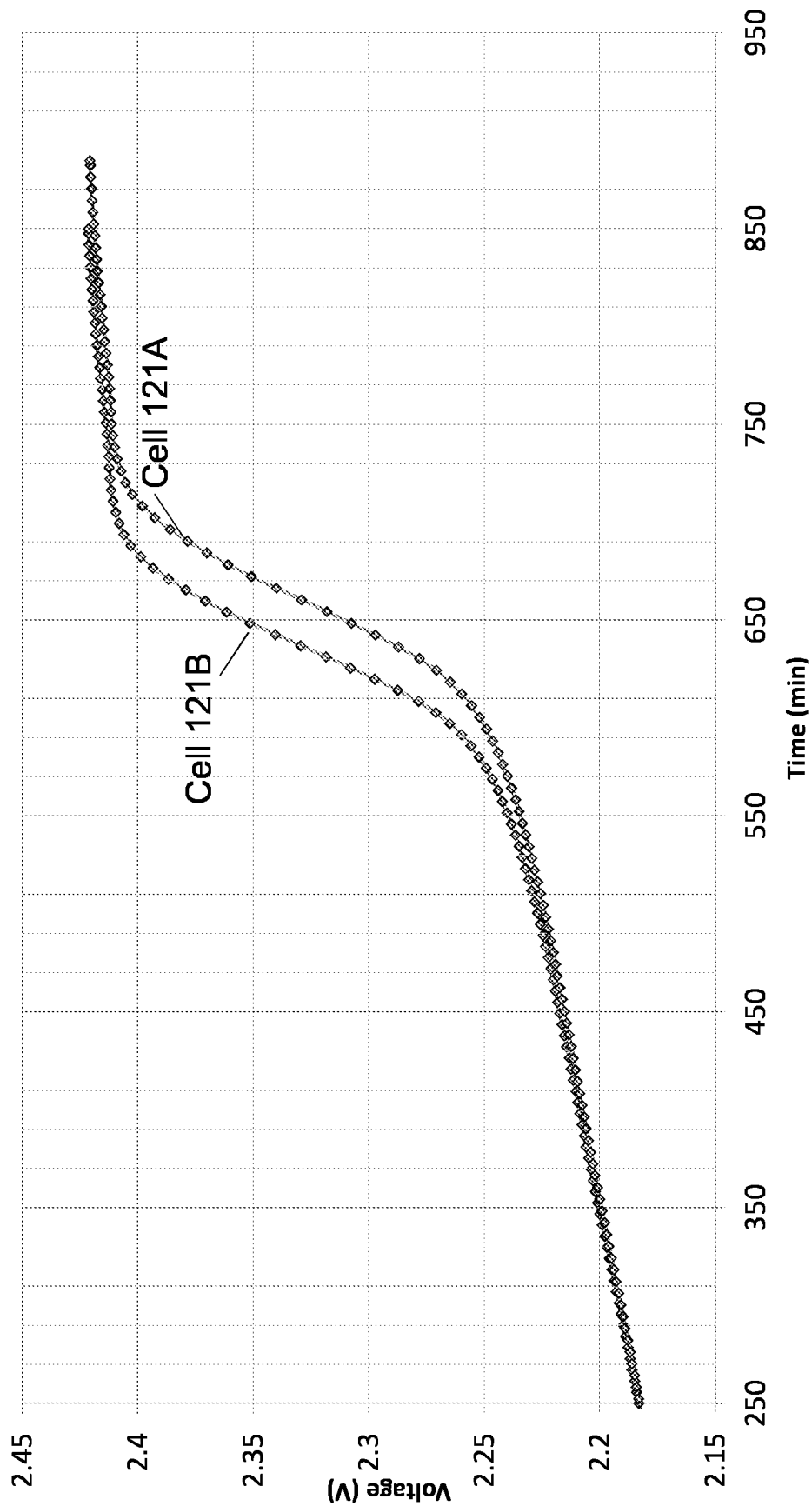
FIG. 3 is a voltage plot for a C/10 constant current charging process illustrating the effect of a capacity loss on the charging curve for a cell plotted adjacent the charging curve of the cell shown in FIG. 2.
Figure 4:
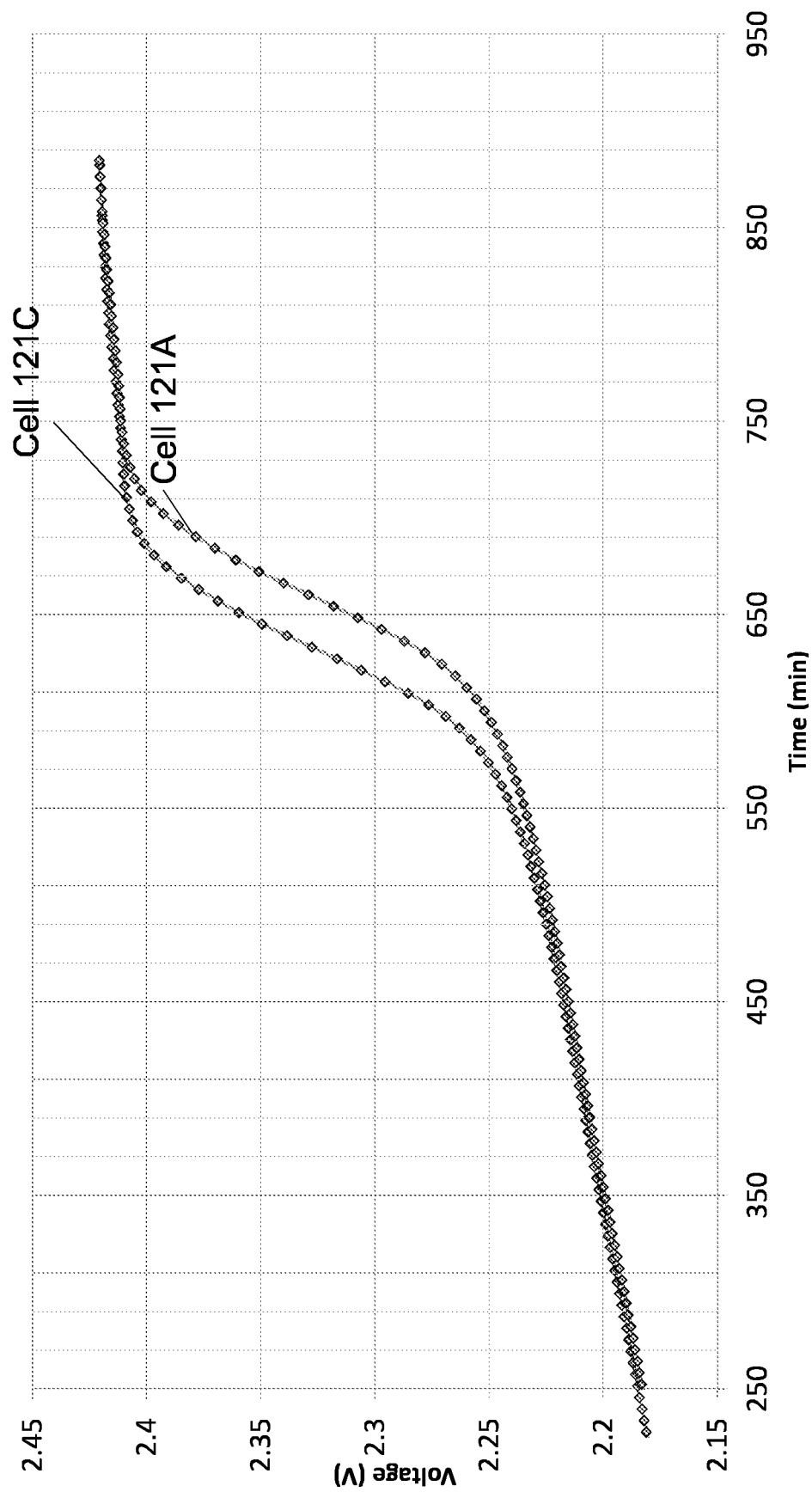
FIG. 4 is a voltage plot for a C/10 constant current charging process illustrating the effect of a greater depth of discharge on the charging curve for a cell plotted adjacent the charging curve of the cell shown in FIG. 2.
Figure 5:
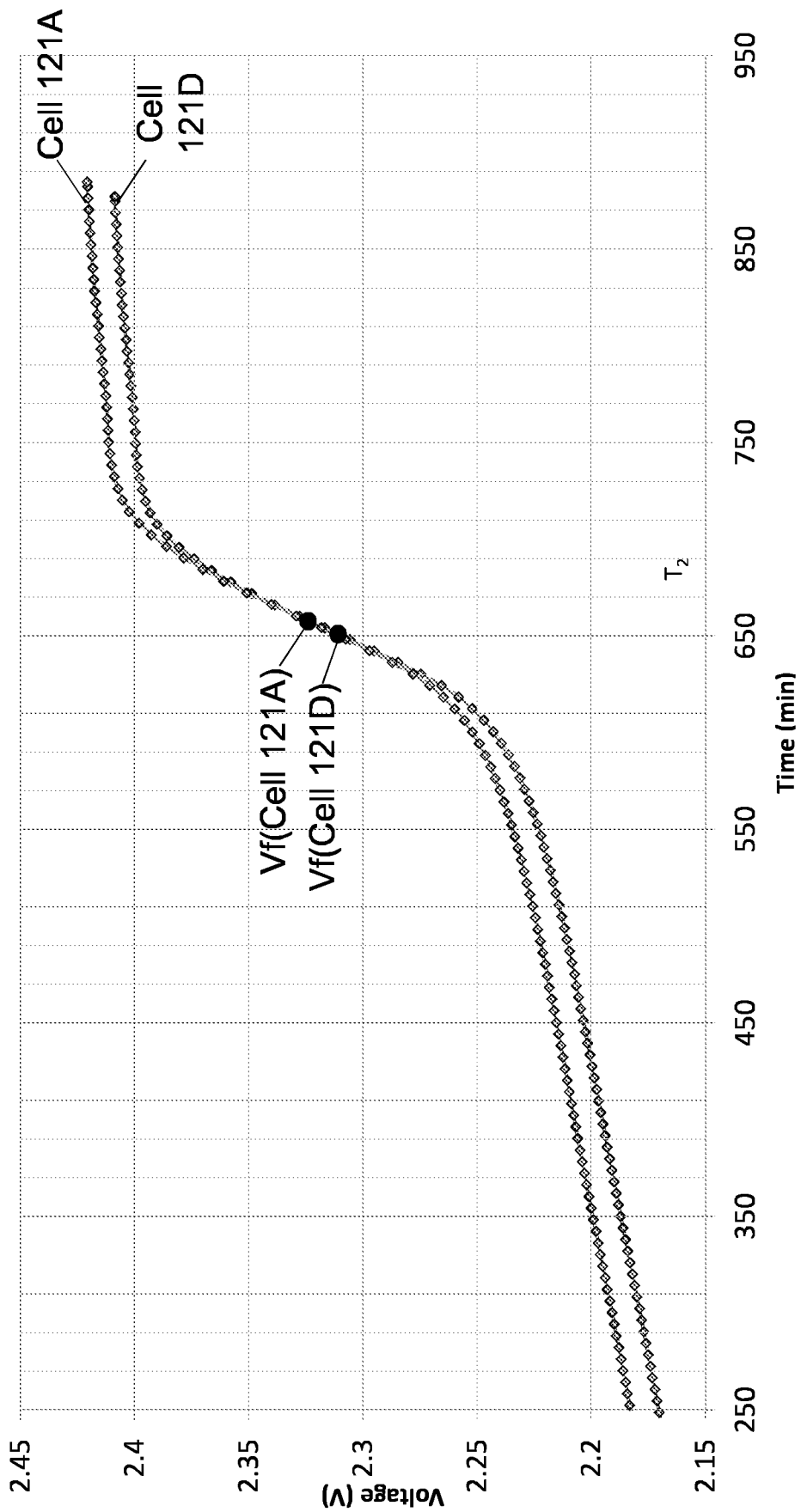
FIG. 5 is a voltage plot for a C/10 constant current charging process illustrating the effect of a voltage measurement error on the charging curve for a cell plotted adjacent the charging curve of the cell shown in FIG. 2.

The effect of these differences on the timestamps and related measured voltages for the cells in charging between 2.30V and 2.35 is thus determined to apportion their effect. An illustration of the effects of each of these factors is shown in FIGS. 3, 4 and 5. It should be noted however that the representation of the charging curves for cells 121B, 121C and 121D shown in FIGS. 2-4 is not based on real data but is instead presented to illustrate an exaggerated effect of capacity loss in a cell, of differences in states of charge and of measurement errors.

The effect of a relative capacity difference is illustrated in FIG. 3. Here, the voltage plot for the C/10 constant current charging process for cell 121B is plotted adjacent the charge curve for cell 121A. It can be seen that the cell 121B leads the cell 121A. This could be because the cell 121B experienced a greater depth of discharge than cell 121A in the previous discharge cycle, and/or because the cell 121B has lost some of its rated capacity and so charged to 100% SOC more quickly than cell 121A. On closer inspection of FIG. 3, however, it can be seen that the time that it takes cell 121B to charge across the voltage increment from 2.30V to 2.35V is less than the time it takes cell 121A to charge across the same voltage increment. This is because cell 121B is charging from 95% to 100% SOC quicker than cell 121A, and so cell 121B thus has experienced some capacity loss. Where such a difference in charge duration across the voltage increment is present, this is indicative of a relative capacity difference between the cells.

In FIG. 4, in contrast, the time taken for the cell 121C to charge across the voltage increment from 2.30V to 2.35V is the same as the time it takes cell 121A to charge across the same voltage increment. In this case the cell 121C leads the cell 121A because the cell 121A experienced a lower depth of discharge than the cell 121C. Thus where no difference in charge duration across the voltage increment is present, but one cell leads another, this is indicative of a relative state of charge difference between the cells.

In FIG. 5, the cells 121D and 121A have the same capacity (in that the duration for them to charge across the voltage increment from 2.30V to 2.35V is the same), and they appear to reach top of charge at 2.35V at the same time. Thus they would appear to have the same state of charge. In fact, cell 121D actually leads cell 121A due to cell 121A having a relatively low state of charge. However, this is not apparent from the cells 121A and 121D reaching 2.35V at the same time because it is masked by the cell 121D having a voltage measurement error. The presence or absence of such a voltage measurement error can be disambiguated by the cell monitoring module 114 determining at what voltage in the curves for the cells 121A and 121D a feature of the charging curve for the Li—S cells occurs, where that feature is known to occur at a given voltage. For example, in Li—S cells, the inflection point in the second stage of charge at which the rate of change of voltage reaches the centre of its peak and starts again to decrease, has been found to occur at a voltage of around 2.33-2.34V that is invariant between identical rated cells. Thus, by determining whether there is a difference between the voltages at which the rate of change of voltage for the cells 121A and 121D reaches its peak value, the presence or absence of a voltage measurement error for the cells can be ascertained.

Figure 6:
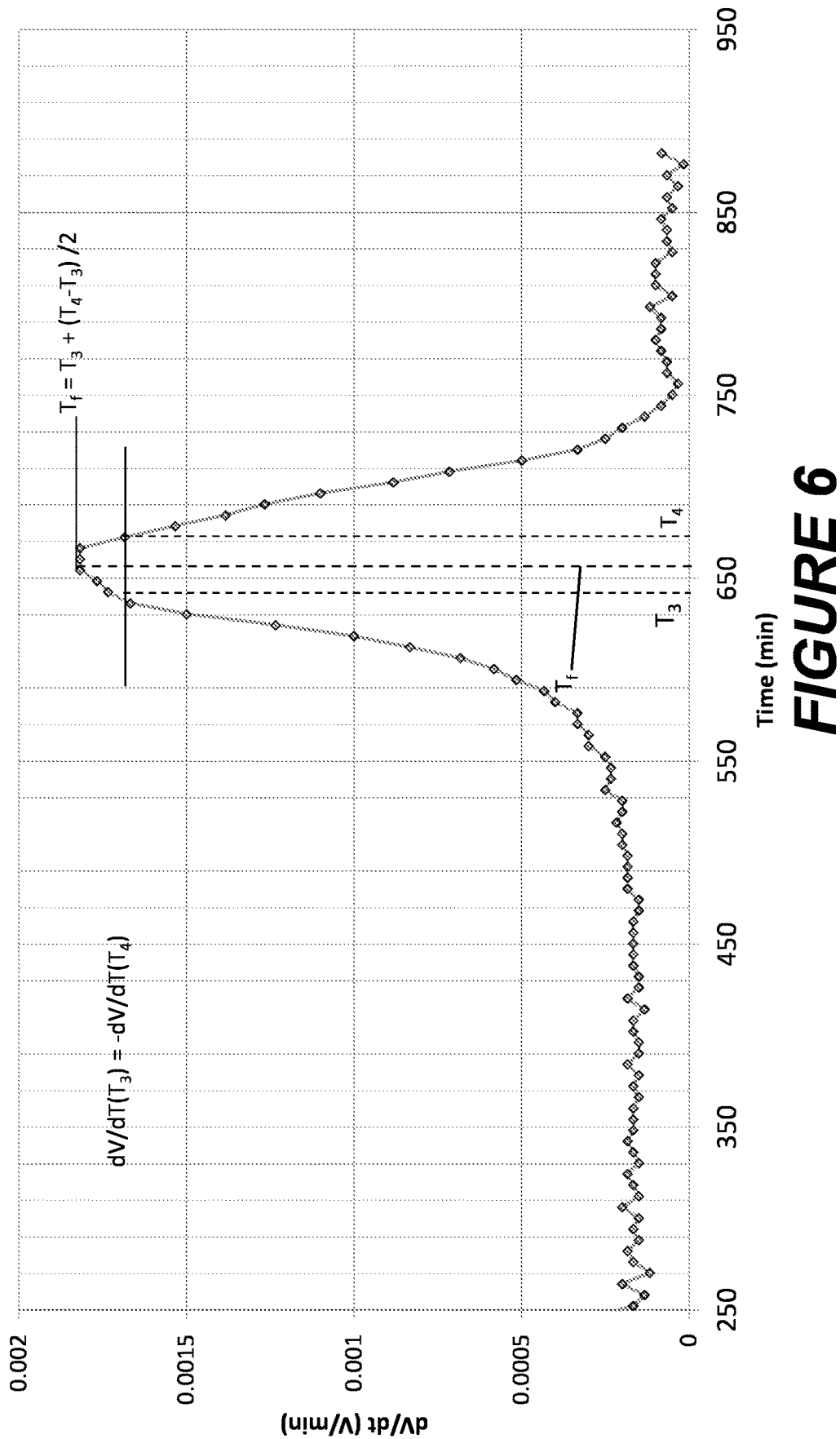
FIG. 6 shows a time stamping method for identifying the centre of the peak of dV/dt in the second stage of Li—S cell charging.

This can be seen in FIG. 6, which plots a measured value of the rate of change of voltage (dV/dT) in the second charging phase. As can be seen, the period where dV/dT is at its maximum can span several minutes, relating to around 1-2% of capacity. To obtaining a more accurate voltage for this reference feature, the voltage monitoring module can be configured to take time stamps as the rate of dV/dT is increasing and again as dV/dT is decreasing, such that at similar points on either side of the peak, a mid-point time value can be determined. That is, times $T_3$ and $T_4$ can be determined, where $dV/dT(T_3)=-dV/dT(T_4)$. The mid-point time value, $T_f$ can be determined, where $Tf=T_3+(T_4-T_3)/2$. The voltage at this measured time value, $T_f$, can be compared with the voltage at the measured value for the other (or rated) cells, and any voltage measurement error can be identified and calibrated for. Alternatively, difference between the measured time value $T_f$ to this known feature between different cells is the difference in each cell reaching a known charging point (occurring around 97%). While this method could be used alone to determine such a time difference, it cannot alone disambiguate between whether one cell leads another due to capacity differences or differences in states of charge.

Nevertheless by knowing the time at which the cell should have reached 97% (bearing in mind that this is all relative to other cells) and a calculated time based on T1 and T2, any deviation between the two can be attributed to voltage measurement errors and therefore the actual state of charge compared with other cells, based on $T_f$ can be calculated. The degree of cell balancing can then be determined based on the previously calculated (method 1) relative capacities.

An alternative feature to identify in the charging curves would be the point at which the second order derivative of voltage with respect to time reaches a maximum, as this is a more defined point which again occurs at a stable voltage that is invariant cell to cell.

With either of these methods, a comparison of the charge reference points will determine which cells have reached a known marker first, and by how much, allowing balancing to be applied where necessary.

To implement the above, specifically, in step 703, the cell monitoring module 114 determines a metric indicative of a relative capacity difference between the cells. For this, the cell monitoring module 114 calculates relative time difference between the duration for a Cell A and a Cell B to charge across the same voltage increment between $V_1$(Cell A) and $V_2$(Cell A) using the equation:

$$(T_1(\text{Cell B}) - T_1(\text{Cell A})) - (V_2(\text{Cell A}) - V_2(\text{Cell B})) \bigg/ \frac{dV}{dt}$$

wherein $$\frac{dV}{dt}$$

is a deemed value of dV/dt over the voltage increment, which is the average rate of change of voltage over time for a rated Lithium Sulfur cell of the type corresponding to cell A from voltage $V_1$ to voltage $V_2$ when charging at the same charge rate and charge efficiency as cell B. Alternatively, the deemed value of dV/dt over the voltage increment is calculated as the measured average rate of change of voltage over time for Cell A or Cell B between $T_1$ and $T_2$ for that cell. The above time difference metric for the relative capacity between the cells A and B can be converted to a percentage relative capacity by dividing it by the duration for Cell A to charge across the voltage increment between $V_1$(Cell A) and $V_2$(Cell A), i.e.:

$$\frac{(T_1(\text{Cell B}) - T_1(\text{Cell A})) - (V_2(\text{Cell A}) - V_2(\text{Cell B})) \big/ \frac{dV}{dt}}{T_2(\text{Cell A}) - T_1(\text{Cell A})}$$

In step 704, the cell monitoring module 114 determines a relative degree of discharge for the cell B $T_2$(cell A) by calculating:

$$\frac{T_2(\text{Cell A})}{T_2(\text{Cell A}) + (V_2(\text{Cell A}) - V_2(\text{Cell B})) \big/ \frac{dV}{dt}}$$

In step 705, the cell monitoring module 114 determines the voltage measurement error for a cell, $V_e$, as $V_m-V_f$, where $V_m$ is a measured observation voltage corresponding to a feature of the charging curve known through testing of the Lithium Sulfur cells to occur in the charging profile at a known voltage $V_f$ between $V_1$ and $V_2$.

Where the known feature of the charging curve is an inflection point, to identify, in the monitored voltage readings for a cell of the plurality of cells, the measured observation voltage $V_m$ corresponding to the inflection point of the charging curve, the cell monitoring module 114 record time stamps at which the rate of change of the monitored voltage for the cell dV/dt reaches a set of given values as dV/dt increases and decreases either side of the inflection. The cell monitoring module 114 then evaluates as $V_m$ a time at which a mid-point between the time stamps corresponding to the increasing and decreasing values of dV/dt occurs.

Alternatively, the cell monitoring module 114 is configured to identify, in the monitored voltage readings for the cell, a measured observation voltage $V_m$ corresponding to the point at which $d^2V/dt^2$ is at a maximum.

Then, in step 706, the outputs of the above equations can be used to control the cell balancing circuit to balance the cells. By working out the differences in relative capacities of all of the series cells, the degree of capacity balancing required for each cell can be calculated. The cell balancing control module 115 may receive the outputs of the cell monitoring module and control the cell balancing circuit, which may operate a passive and/or active scheme to balance the cells, which can occur at any time through storage, discharge or charge (prior to the 2.30V threshold). It is the lowest capacity cell that should reach the end of charge voltage first, if it doesn't then it is all the cells leading it that need balancing.

Cell balancing can be achieved by implementing a charge correction scheme that could be based on any of the following:
1) Pausing the charge process so a relative amount of charge can be drawn from the strongest cells, so they all match the weakest cell and the charge then recommence to top up all the cells (either active or passive balancing techniques can be used, but diverting current for a calculated period of time rather than based on a voltage measurement.
2) Charge can be equalised during a storage state, by diverting a known quantity of charge from each cell over an extended period of time.

3) Charge equalisation during the discharge process. Current diverting can occur during a discharge by applying the charge diverting techniques for a known period to divert the required quantity of charge.
4) If the end of charge point has been reached through voltage measurement error (see example 1 below, (Cell 121A)) a period of 'over charge' may be applied to allow an actual 100% state of charge to be reached.

As will now be shown in relation to three worked examples, by using the above techniques, the cell monitoring module 114 determines the extent to which there are relative capacity differences and relative states of charge differences between the cells based on the time stamps and voltages passed to it by cell monitoring module 113, while calibrating for the effects of any measurement errors.

The data presented in these worked examples is for a set of Li—S cells 121A, 121B, 121C and 121D which are charged in a constant current charging rate of C/10.

Example 1—Measurement Error

Cell 121A is the leading cell and is measured to reach $V_1$ at $T_1=636.5$ mins and $V_2$ (at which it is deemed to have an SOC of 100%) at $T_2=670$ mins.

Cell 121B reaches $T_1$ after 643.2 mins and has a measured voltage $V_2$ of 2.34V at $T_2$.

The relative capacities can be worked out as (where the rate of change of voltage between $V_1$ and $V_2$ is 1.49 mV per minute for a rated cell of the type of cell A and B):

$$(T_1(\text{Cell 121B}) - T_1(\text{Cell 121A})) -$$
$$(V_2(\text{Cell 121A}) - V_2(\text{Cell 121B}))\Big/\frac{dV}{dt} =$$
$$(643.2 \text{ mins} - 636.5 \text{ mins}) - (2.35 \text{ V} - 2.34 \text{ V})/0.00149 \text{ Vmin}^{-1} =$$
$$0 \text{ seconds}$$

Thus there is no time difference at all. The lack of a difference indicates that although the charge termination voltages are different, the capacities still match.

The cause of this difference in the termination voltages could be due to a relatively deeper discharge of cell 121B. However, the actual cause was identified from analysing dV/dt that cell 121A reaches the mid-point of its dV/dt peak at 6.7 minutes (i.e. 1% SOC) earlier than cell 121B. This indicates a +10 mV error in the measurement of the voltage of cell 121A here. Thus, although the termination voltage $V_2$ will have been reached by cell 121A, with a +10 mV error the cell would show 100% but have an actual charged capacity of 99%.

In the above example, although there is a measurement error in one cell, the cells can be proved to have the same capacity and therefore do not require balancing. However, the charge process could then continue to charge both of the cells 121A and 121B to 100% SOC.

Example 2—Relative States of Charge

Cell 121C reaches $T_1$ after 649.9 mins, and has a measured voltage V2 of 2.33V at $T_2$, then it is calculated as above to have a relative capacity difference with respect to cell 121A of:

=(649.9 mins−636.5 mins)−(2.35$V$−2.33$V$)/0.00149$V$ min$^{-1}$=0 seconds

Again there is no time difference at all. The lack of a difference again indicates that although the charge termination voltages are different, the capacities still match.

Indeed, calculating the state of charge of cell 121B compared to the performance of a rated cell using the above measurements, gives the following:

$$\frac{T_2(\text{Cell 121A})}{T_2(\text{Cell 121A}) + (V_2(\text{Cell 121A}) - V_2(\text{Cell 121C}))\Big/\frac{dV}{dt}} =$$

$$\frac{670 \text{ mins}}{670 \text{ mins} + (2.35 \text{ V} - 2.33 \text{ V})/0.00149 \text{ Vmin}^{-1}} = 98.0\%$$

This makes sense as a 20 mV difference at $V_2$ equates to 2% SOC. However, from analysing voltage at which the dV/dt of cell 121C reaches the mid-point of its dV/dt peak, it was found that there was a −5 mV measurement error for cell 121C, such that its actual voltage at $T_2$ is 2.335 mV. Repeating the above calculation for the SOC of cell 121B relative to a rated cell gives an actual state of charge of:

$$\frac{670 \text{ mins}}{670 \text{ mins} + (2.35 \text{ V} - 2.335 \text{ V})/0.00149 \text{ Vmin}^{-1}} = 98.5\%$$

Thus cell 121C has the same capacity as A and B, but has been subject to a higher self-discharge, and so balancing would be required to bring the cells to the same SOC.

Example 3—Relative Capacity Difference

In this example, cell 121D (not shown) reaches $V_1=2.30$V after $T_1=633.3$ minutes and $V_2=2.35$V at $T_2=666.6$ minutes and so is in this example the leading cell.

Cell 121A then reaches $V_1=2.30$ as before at $T_1=636.5$ mins but at $T_2=666.6$ minutes cell 121A reaches $V_2=2.345$V.

Then cell 121D is calculated as above to have a relative capacity difference with respect to cell 121A of:

$$(T_1(\text{Cell 121D}) - T_1(\text{Cell 121A})) -$$
$$(V_2(\text{Cell 121A}) - V_2(\text{Cell 121B}))\Big/\frac{dV}{dt} =$$
$$(633.3 \text{ mins} - 636.5 \text{ mins}) - (2.345 \text{ V} - 2.35 \text{ V})/0.00149 \text{ Vmin}^{-1} =$$
$$9 \text{ seconds}$$

Thus there is a capacity difference between cells 121A and 121D which is illustrated by the above metric, which shows that cell 121A is projected to take 9 seconds longer than cell 121D to charge over the voltage increment of 2.30-2.35V.

To convert this into a relative capacity measure, for illustration, $$\frac{(T_1(\text{Cell 121D}) - T_1(\text{Cell 121A})) -}{T_2(\text{Cell 121A}) - T_1(\text{Cell 121A})} =$$

$$\frac{(633.3 \text{ mins} - 636.5 \text{ mins}) -}{\frac{(2.345 \text{ V} - 2.35 \text{ V})/0.00149 \text{ Vmin}^{-1}}{666.6 \text{ mins} - 636.5 \text{ mins}}}$$

Thus cell 121D actually has a reduced capacity of 0.5% compared with the other cells. Thus balancing of the cells is needed to ensure the cell 121D is not overcharged and is in line with the other cells.

It should thus be evident from the above that it is possible to accurately determine the relative capacity differences, state of charge differences and measurement errors of Li—S cells by monitoring the cell voltages, the times at which the cells reach certain voltages, and the times at which the charging curves reach certain features known to occur at given voltages. This allows effective Li—S cell stack balancing to be performed even where the accuracy of the voltage measurements is relatively low. Indeed, the above examples assume an offset error in the voltage measurement, given a 0.6 mV resolution for a 12 bit ADC, any offset error associated with the voltage measurement can be mitigated. Further, the ADC linearity and gain error over the 50 mV range would be in the order of 0.1 LSB and therefore also mitigated, leaving an LSB reading error of 0.6 mV (~0.3% relative SOC error, potentially reduced through an averaging process over time). The timing error would also be insignificant. It should be noted that the gain error of any measurement circuit will have to be taken into account, but is unlikely to have a significant impact over the range being tested.

The above methods also allow the relative characteristics and charge performances of the Li—S cells to be monitored and tracked from one charge cycle to another by monitoring the time differential between T1 and T2 of the lead cell. Thus capacity degradation of the cells, and their relative capacities and depths of discharge could be monitored over time and compensated for in a charge balancing process.

In addition, the above methods allow charge balancing to be performed by allowing 'over charging'. That is, if a cell is deemed to have the same capacity as another, but reaches its end of charge (EOC) voltage first, it may be possible to allow an 'over charge' for that cell, especially if the dv/dt point of inflection is used as a capacity comparison marker for all cells. If the time stamping indicates that cell A has the same capacity as cell B, but cell A reached its inflection point and EOC point proportionally before cell B, then it may be reasonably assumed that cell A could continue to charge past EOC for a period equaling the time difference between cells A and B reaching their inflection points.

The invention claimed is:

1. An apparatus for monitoring relative capacity and state of charge between at least two cells, or cell modules, A and B of a plurality of Lithium Sulfur cells arranged in series, comprising:
   a timer;
   a voltage monitoring module configured to monitor a voltage drop across each of the Lithium Sulfur cells or cell modules arranged in series based on signals received from a voltage monitoring circuit; and
   a cell monitoring module coupled to the timer and the voltage monitoring module and configured to, during a charging cycle in which the cells are charged at a constant current:
   record a time stamp $T_1$(Cell A) at which the monitored voltage of the first cell, cell A, leading the charging reaches a first voltage $V_1$(cell A) set to be in a second stage of charge near top of charge as a rate of change of monitored voltage measurably increases;
   record a time stamp $T_1$(Cell B) at which the monitored voltage of the cell B following the charging reaches the first voltage $V_1$(Cell A);
   record a time stamp $T_2$(Cell A) at which the monitored voltage of the leading cell A reaches a second voltage $V_2$(Cell A) set to be substantially at a deemed top of charge;
   record a monitored voltage $V_2$(Cell B) of the following cell B at $T_2$(Cell A); and
   determine, based on at least $T_1$(Cell A), $T_1$(Cell B), $V_2$(Cell A) and $V_2$(Cell B), a metric indicative of a relative capacity difference between cell A and cell B.

2. The apparatus as claimed in claim 1, wherein the cell monitoring module is further configured to determine, as the metric indicative of a relative capacity difference between cell A and cell B, a relative time difference between a duration for Cell A to charge across a voltage increment between $V_1$(Cell A) and $V_2$(Cell A) and the projected duration for Cell B to charge across the same voltage increment.

3. The apparatus as claimed in claim 2, wherein the cell monitoring module is configured to calculate the relative time difference between the duration for Cell A and Cell B to charge across the same voltage increment between $V_1$(Cell A) and $V_2$(Cell A) using the equation:

$$(T_1(\text{Cell } B) - T_1(\text{Cell } A)) - (V_2(\text{Cell } A) - V_2(\text{Cell } B)) \bigg/ \frac{dV}{dt}$$

wherein $$\frac{dV}{dt}$$

is a deemed value of dV/dt over the voltage increment.

4. The apparatus as claimed in claim 3, wherein the deemed value of dV/dt over the voltage increment is calculated as an average rate of change of voltage over time for a rated Lithium Sulfur cell of the type corresponding to cell A from voltage $V_1$ to voltage $V_2$ when charging at the same charge rate and charge efficiency as cell B.

5. The apparatus as claimed in claim 3, wherein the deemed value of dV/dt over the voltage increment is calculated as the measured average rate of change of voltage over time for Cell A or Cell B between $T_1$ and $T_2$ for that cell.

6. The apparatus as claimed in claim 3, wherein the cell monitoring module is further configured to calculate, for a relative capacity difference between Cell A and Cell B, the relative time difference between the duration for Cell A and Cell B to charge across the same voltage increment between $V_1$(Cell A) and $V_2$(Cell A) divided by the duration for Cell A to charge across the voltage increment between $V_1$(Cell A) and $V_2$(Cell A), i.e.:

$$\frac{(T_1(\text{Cell } B) - T_1(\text{Cell } A)) - (V_2(\text{Cell } A) - V_2(\text{Cell } B)) \big/ \frac{dV}{dt}}{T_2(\text{Cell } A) - T_1(\text{Cell } A)}.$$

7. The apparatus as claimed in claim 1, wherein the cell monitoring module is further configured to determine the metric indicative of a relative capacity difference between cells for each of the plurality of Lithium Sulfur cells connected in series taking account of charging efficiency calculated as a function of expected capacity and measured charge in over the time period T1 to T2.

8. The apparatus as claimed in claim 1, wherein the cell monitoring module is further configured to determine a degree of discharge or relative SOC of a cell x of the cells at $T_2$(Cell A) by calculating:

$$\frac{T_2(\text{Cell A})}{T_2(\text{Cell A}) + (V_2(\text{Cell A}) - V_2(\text{Cell } x))/\frac{dV}{dt}}.$$

9. The apparatus as claimed in claim 1, wherein, to compensate for voltage measurement errors for a cell of the plurality of cells, the cell monitoring module is further configured to:
analyse the monitored voltage readings for the cell over time to identify a measured observation voltage $V_m$ of a feature of the voltage curve known to occur in the charging profile of Lithium Sulfur cells of the same type as Cell A at a known voltage $V_f$ as the cell charges from $V_1$(Cell A) towards $V_2$(Cell A); and
calculate a voltage measurement error of cell $V_e$ as $V_m - V_f$.

10. The apparatus as claimed in claim 9, wherein the cell monitoring module is configured to identify, in the monitored voltage readings for a cell of the plurality of cells, a measured observation voltage $V_m$ corresponding to a feature of the charging curve known through testing of the Lithium Sulfur cells to occur in the charging profile at a known voltage $V_f$ between $V_1$ and $V_2$.

11. The apparatus as claimed in claim 10, wherein the known feature of the charging curve is an inflection point, and wherein to identify, in the monitored voltage readings for a cell of the plurality of cells, a measured observation voltage corresponding to the inflection point of the charging curve, the cell monitoring module is configured to:
record time stamps at which the rate of change of the monitored voltage for the cell dV/dt reaches a set of given values as dV/dt increases and decreases either side of the inflection;
evaluate a time at which a mid-point between the time stamps corresponding to the increasing and decreasing values of dV/dt occurs; and
evaluate a monitored voltage observed at the mid-point time as a monitored observation voltage for the inflection point.

12. The apparatus as claimed in claim 9, wherein the cell monitoring module is configured to identify, in the monitored voltage readings for the cell, a measured observation voltage corresponding to the point at which $d^2V/dt^2$ is at a maximum, which is known through testing of the Lithium Sulfur cells to occur in the charging profile at a known voltage between $V_1$ and $V_2$.

13. The apparatus as claimed in claim 9, wherein the cell monitoring module is further configured to: correct the monitored voltage values for a cell based on any observed voltage measurement error $V_e$ for that cell.

14. Apparatus as claimed in claim 1, wherein the cell monitoring module is further configured to determine a degree of discharge or relative SOC of a cell x of the cells at $T_2$(Cell A) by calculating:

$$\frac{T_2(\text{Cell A})}{T_2(\text{Cell A}) + (V_2(\text{Cell A}) - V_2(\text{Cell } x))/\frac{dV}{dt}}$$

wherein, to compensate for voltage measurement errors for a cell of the plurality of cells, the cell monitoring module is further configured to:
analyse the monitored voltage readings for the cell over time to identify a measured observation voltage $V_m$ of a feature of the voltage curve known to occur in the charging profile of Lithium Sulfur cells of the same type as Cell A at a known voltage $V_f$ as the cell charges from $V_1$(Cell A) towards $V_2$(Cell A); and
calculate a voltage measurement error of cell $V_e$ as $V_m - V_f$; and wherein the cell monitoring module is further configured to adjust the charged capacity calculation at $T_2$(Cell A) based on any observed voltage measurement error $V_e$ to obtain an actual charged capacity for the cell.

15. The apparatus as claimed in claim 1, further comprising a cell balancing control module, for balancing a charge across a plurality of the cells, the cell balancing control module being coupled to a cell balancing circuit operable by the cell balancing control module to actively or passively adjust the relative charge between one or more of the cells, the cell balancing control module also being coupled to the cell monitoring module and being configured to:
control the operation of the cell balancing circuit in a constant current charging process or in a discharging process to cause the state of charge across a plurality of the cells to be more balanced based on one or more of:
one or more values, received from the cell monitoring module, for a metric indicative of a relative capacity difference(s) between a plurality of the cells; and
one or more values, received from the cell monitoring module, indicative of a degree of SOC variation of one or more of the cells at top of charge.

16. The apparatus as claimed in claim 15, wherein the cell balancing control module and the cell balancing circuit, to cause the cells to be more balanced, are configured together:
during a constant current charging process, pause the charge process to cause an amount of charge to be drawn from, among the charged cells, the strongest cells based on a period of time calculated by the cell monitoring module, so a plurality of the cells all match the weakest cell; and
then recommence charging to top up all the cells.

17. The apparatus as claimed in claim 15, wherein the cell balancing control module and the cell balancing circuit, to cause the cells to be more balanced, are configured together:
during a storage state, divert a known quantity of charge from one or more of the cells to other cells over an extended period of time to equalise the state of charge across a plurality of the cells.

18. The apparatus as claimed in claim 15, wherein the cell balancing control module and the cell balancing circuit, to cause the cells to be more balanced, are configured together:
during the discharge process, divert a known quantity of charge from one or more of the cells to other cells to equalise the state of charge across a plurality of the cells.

19. The apparatus as claimed in claim 15, wherein the cell balancing control module and the cell balancing circuit, if the top of charge voltage is determined by the cell monitoring module to have been reached through voltage measurement error, are configured together:
continue a charging process for a period to allow an actual 100% state of charge to be reached for the cells.

20. The apparatus as claimed in claim 1, further comprising one or more processors and computer readable medium storing instructions, which when executed by one or more of the processors, cause the processor or processors to implement one or more of the timer, the voltage monitoring module, the cell monitoring module, and the cell balancing control module of apparatus as claimed in claim 1.

21. The apparatus as claimed in claim 1, further comprising a voltage monitoring circuit configured to measure a voltage drop across each of the Lithium Sulfur cells arranged in series and to provide signals indicative of said measured voltage drops to said voltage monitoring module.

22. A battery management system comprising plural Lithium Sulfur cells or energy system controller for coupling to plural Lithium Sulfur cells, comprising:
apparatus claimed in claim 1 arranged to monitor relative capacity and state of charge between at least two cells and to cause the cells to be balanced.

23. A computer-readable medium storing instructions, which when executed by one or more processors of an apparatus for monitoring relative capacity and state of charge between at least two cells, or cell modules, A and B of a plurality of Lithium Sulfur cells arranged in series, cause the processor or processors to implement one or more of a timer, a voltage monitoring module, a cell monitoring module, and a cell balancing control module of apparatus in connection with the following:
record a time stamp T1(Cell A) at which the monitored voltage of a first cell, cell A, leading the charging reaches a first voltage V1(cell A) set to be in a second stage of charge near top of charge as a rate of change of monitored voltage measurably increases;
record a time stamp T1(Cell B) at which the monitored voltage of the cell B following the charging reaches the first voltage V1(Cell A);
record a time stamp T2(Cell A) at which the monitored voltage of the leading cell A reaches a second voltage V2(Cell A) set to be substantially at a deemed top of charge;
record a monitored voltage V2(Cell B) of the following cell B at T,2(Cell A); and
determine, based on at least T1(Cell A), T1(Cell B), V2(Cell A) and V2(Cell B), a metric indicative of a relative capacity difference between cell A and cell B.

24. A computer-implemented method for monitoring relative capacity and state of charge between at least two cells, or cell modules, A and B of a plurality of Lithium Sulfur cells arranged in series, comprising:
monitoring a voltage across each of the Lithium Sulfur cells or cell modules arranged in series based on signals received from a voltage monitoring circuit; and
during a charging cycle in which the cells are charged at a constant current:
recording a time stamp $T_1$(Cell A) at which the monitored voltage of the first cell, cell A, leading the charging reaches a first voltage $V_1$(cell A) in a second stage of charge set to be near top of charge as the rate of change of the monitored voltage measurably increases;
recording a time stamp $T_1$(Cell B) at which the monitored voltage of the cell B following the charging reaches the first voltage $V_1$(Cell A);
recording a time stamp $T_2$(Cell A) at which the monitored voltage of the leading cell A reaches a second voltage $V_2$(Cell A) set to be substantially at a deemed top of charge;
recording a monitored voltage $V_2$(Cell B) of the following cell B at $T_2$(Cell A); and
determining, based on at least $T_1$(Cell A), $T_1$(Cell B), $V_2$(Cell A) and $V_2$(Cell B), a metric indicative of a relative capacity difference between cell A and cell B or variation in relative state of charge.

25. The computer-implemented method as claimed in claim 24, further comprising:
determining, as the metric indicative of a relative capacity difference between cell A and cell B, a relative time difference between the duration for Cell A to charge across the voltage increment between $V_1$(Cell A) and $V_2$(Cell A) and the projected duration for Cell B to charge across the same voltage increment.

26. The computer-implemented method as claimed in claim 25, further comprising:
calculating the relative time difference between the duration for Cell A and Cell B to charge across the same voltage increment between $V_1$(Cell A) and $V_2$(Cell A) using the equation:

$$(T_1(\text{Cell } B) - T_1(\text{Cell } A)) - (V_2(\text{Cell } A) - V_2(\text{Cell } B)) \bigg/ \frac{dV}{dt}$$

wherein $$\frac{dV}{dt}$$

is a deemed value of dV/dt over the voltage increment.

27. The computer-implemented method as claimed in claim 26, wherein the deemed value of dV/dt over the voltage increment is calculated as average rate of change of voltage over time for a rated Lithium Sulfur cell of the type corresponding to cell A from voltage $V_1$ to voltage $V_2$ when charging at the same charge rate and charge efficiency as cell B.

28. The computer-implemented method as claimed in claim 26, wherein the deemed value of dV/dt over the voltage increment is calculated as the measured average rate of change of voltage over time for Cell A or Cell B between $T_1$ and $T_2$ for that cell.

29. The computer-implemented method as claimed in claim 26, further comprising:
calculating, for a relative capacity difference between Cell A and Cell B, the relative time difference between the duration for Cell A and Cell B to charge across the same voltage increment between $V_1$(Cell A) and $V_2$(Cell A) divided by the duration for Cell A to charge across the voltage increment between $V_1$(Cell A) and $V_2$(Cell A), i.e.:

$$\frac{(T_1(\text{Cell } B) - T_1(\text{Cell } A)) - (V_2(\text{Cell } A) - V_2(\text{Cell } B)) \bigg/ \frac{dV}{dt}}{T_2(\text{Cell } A) - T_1(\text{Cell } A)}.$$

30. The computer-implemented method as claimed in claim 25, further comprising:
determining the metric indicative of a relative capacity difference between cells for each of the plurality of Lithium Sulfur cells connected in series.

* * * * *